Figure 1:
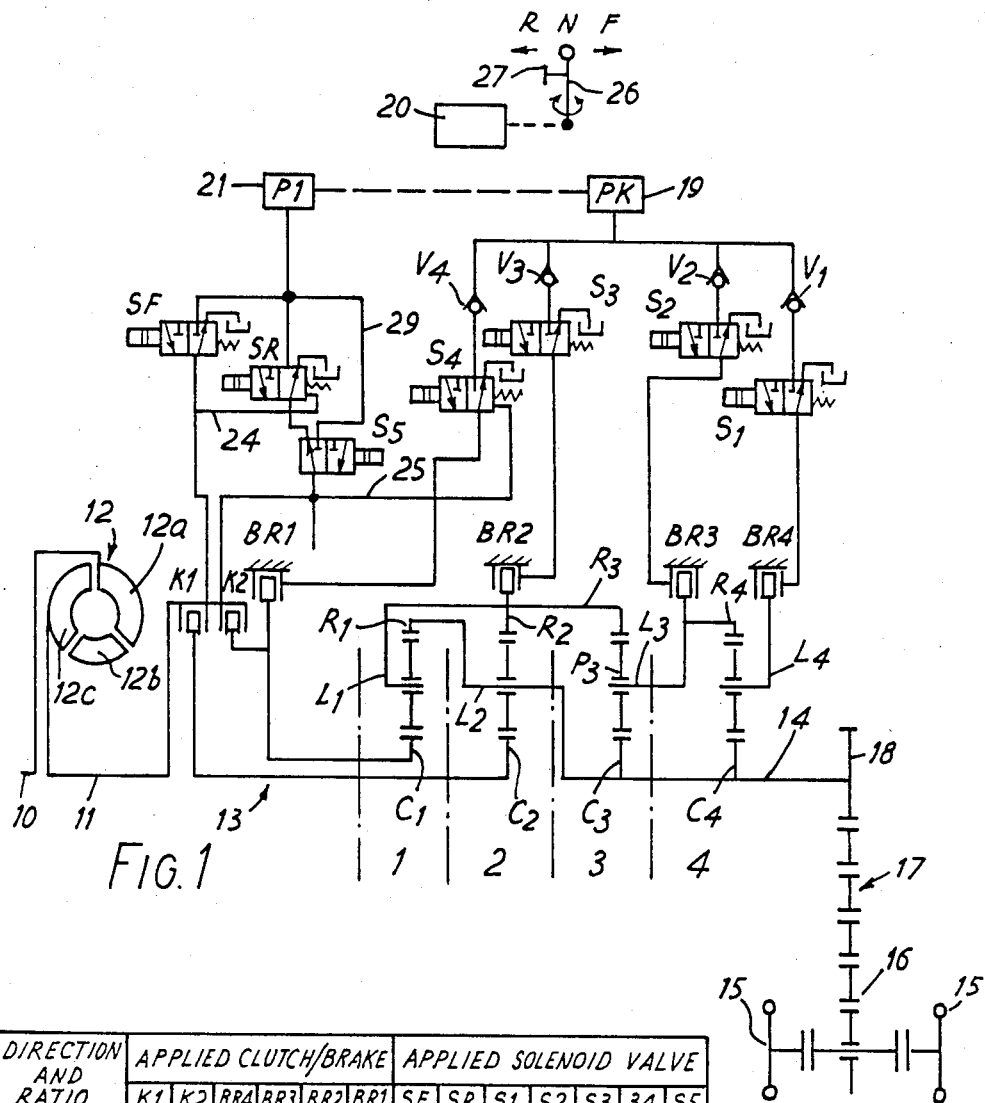

United States Patent [19]

Knecht

[11] Patent Number: 4,724,726

[45] Date of Patent: Feb. 16, 1988

[54] VEHICLE POWER TRANSMISSIONS

[76] Inventor: Emil H. Knecht, Sandbacksvaegen 3, S-15200 Straengnaes, Sweden

[21] Appl. No.: 884,374

[22] Filed: Jul. 11, 1986

[30] Foreign Application Priority Data

Jul. 15, 1985 [GB] United Kingdom ............... 8517851
Oct. 14, 1985 [GB] United Kingdom ............... 8525245

[51] Int. Cl.$^4$ .................. B60K 41/16; B60K 41/18; F16H 3/74
[52] U.S. Cl. ................... 74/866; 74/752 A; 74/867
[58] Field of Search ............ 74/861, 866, 867, 752 A

[56] References Cited

U.S. PATENT DOCUMENTS

| 3,738,182 | 6/1973 | Kubo et al. | 74/866 |
| 3,805,640 | 4/1974 | Schneider et al. | 74/866 X |
| 4,172,393 | 10/1979 | Miller | 74/759 |
| 4,178,518 | 12/1979 | Phelps | 74/866 X |
| 4,222,292 | 9/1980 | Will et al. | 74/861 X |
| 4,253,346 | 3/1981 | Kuhnle et al. | 74/866 X |
| 4,309,918 | 1/1982 | Miller et al. | 74/867 |
| 4,346,626 | 8/1982 | Kawamoto | 74/866 |
| 4,425,620 | 1/1984 | Batcheller et al. | 74/866 X |
| 4,519,273 | 5/1985 | Shimizu et al. | 74/866 X |
| 4,580,466 | 4/1986 | Iwanaga | 74/868 |
| 4,616,531 | 10/1986 | Ogasawara et al. | 74/866 |

FOREIGN PATENT DOCUMENTS

| 0004655 | 1/1985 | Japan | 74/869 |
| 7905695-8 | 3/1981 | Sweden . | |
| 1597950 | 9/1981 | United Kingdom . | |
| 2085535B | 4/1983 | United Kingdom . | |
| 2055999B | 4/1983 | United Kingdom . | |

Primary Examiner—Dirk Wright
Attorney, Agent, or Firm—Flynn, Thiel, Boutell & Tanis

[57] ABSTRACT

A transmission for a vehicle which is frequently reversed comprises a torque convertor driven by an internal combustion engine, and planetary change speed gearing having an input driven by the torque convertor and an output connected to driving wheels of the vehicle. The individual speed ratios in both forward and reverse directions of drive are selectively engaged by engagement of associated friction elements to provide a plurality of forward speed ratios and at least one reverse speed ratio. In response to movement of a control element from a first position corresponding to the prevailing direction of drive to a second position corresponding to the opposite direction of drive, a control device causes release of the friction element determining the ratio engaged in the prevailing direction of drive, engagement of the friction element associated with a high speed ratio in the opposite direction of drive and initiation of engagement of the friction element associated with a lower speed ratio in the opposite direction of drive, followed by release of the friction element associated with the high ratio in the opposite direction after a period of retardation of the vehicle but preferably before its speed has been reduced to zero in the prevailing direction.

3 Claims, 4 Drawing Figures

| DIRECTION AND RATIO | APPLIED CLUTCH/BRAKE | | | | | | APPLIED SOLENOID VALVE | | | | | | |
|---|---|---|---|---|---|---|---|---|---|---|---|---|---|
| | K1 | K2 | BR4 | BR3 | BR2 | BR1 | SF | SR | S1 | S2 | S3 | S4 | S5 |
| R3 (-1.75) | | X | | X | | | | X | | | X | | |
| R2 (-3.19) | | X | X | | | | | X | X | | | | |
| R1 (-5.38) | | X | X | | | | | X | X | | | | |
| N — | | | | | | | | | | | | | |
| F1 (5.88) | X | | X | | | | X | | X | | | | |
| F2 (4.2) | X | | | X | | | X | | | X | | | |
| F3 (3.1) | X | | | | X | | X | | | | X | | |
| F4 (1.76) | X | | | | | X | X | | | | | X | |
| F5 (1.0) | X | X | | | | | X | | | | | | X |

VEHICLE POWER TRANSMISSIONS

The present invention relates to vehicle power transmissions for work vehicles which frequently have to change their direction of movement. An example of such a vehicle is a wheeled loader having a bucket for collecting material such as sand or coal from a pile on the ground and transferring it into a larger vehicle or conveyor. Such a loader may only travel for a distance of five or ten meters before having to reverse its direction of movement, for example having collected a bucketful of material from the pile and moved backwards from the pile, it has to move forwards to transport the load in its bucket to the conveyor, then move backwards from the conveyor and thereafter forwards again to the pile.

Suitable geared transmissions for use in such vehicles are disclosed in U.S. Pat. No. 4,172,393. Further, Swedish published Patent Specification No. 7905695-8 discloses a method of reversing such a vehicle while maintaining the engine running at normal speed and load and a suitable transmission control system for carrying out the method. In the transmission described in the Swedish specification, the engine drives the wheels through a torque convertor and a gearbox. While moving in one direction, the driver can move a direction control lever (which may also control selection of some or all of the ratios) into a position corresponding to movement of the vehicle in the opposite direction. Provided that the vehicle speed is below a predetermined value, the working direction in the gearbox is reversed so that the torque transmitted from the engine through the torque convertor to the gearbox retards the vehicle until the latter is brought to rest and thereafter accelerates the vehicle in the opposite direction.

An object of the present invention is to provide further improved retardation and thus faster change of direction without shock.

A further object of the invention is to reduce the heat energy dissipated in the torque convertor and thus to obviate excessive rise of temperature therein, while still achieving the optimum rate of retardation.

According to the present invention, there is provided a transmission for a vehicle comprising a torque convertor to be driven by an internal combustion engine, and planetary change speed gearing having an input driven by the output of the torque convertor and an output connected to the driving wheels of the vehicle, the change-speed gearing being of the kind in which the individual speed ratios in both a forward direction and a reverse direction of drive are each selectively engaged by the engagement of associated friction elements to provide a plurality of speed ratios in the forward direction and at least one speed ratio in the reverse direction and a driver-operated direction control element, characterised by control means responsive to movement of the control element from a first position corresponding to the prevailing direction of drive to a second position corresponding to the opposite direction of drive, to cause the following operations in sequence:

release of the friction element or elements determining the ratio engaged in the prevailing direction of drive, engagement of the friction element or elements associated with a high speed ratio in the opposite direction of drive and initiating engagement of the friction element or elements associated with a lower speed ratio in the said opposite direction of drive, followed by release of the friction element or elements associated with the said high ratio in the said opposite direction after a period of retardation of the vehicle but preferably before its speed has been reduced to zero in the said prevailing direction.

When the friction elements of two different ratios in the same drive direction are applied simultaneously (each with its normal engaging force) under conditions of retardation described above, the higher of the two ratios tends to prevail, that is to say, the friction elements of the higher ratio tend to become fully engaged while those of the lower ratio are compelled to slip. Thus the higher ratio becomes kinematically effective in determining the relative speeds of input and output members of the transmission.

During the time that the vehicle continues to move in the prevailing direction with the high speed ratio of the opposite direction effectively engaged, the output of the torque convertor is forced to rotate counter to the direction of its input, thereby exerting retardation as in the case of the above-mentioned Swedish Patent Specification but at a lower value of retardation because the counter rotation is at a lower speed due to a relatively high ratio of the opposite direction being effective. Additional retardation is however exerted by the application (in slipping condition) of the friction element associated with the lower ratio of the opposite direction. When the friction element of the high speed ratio of the opposite direction is released, the engine driving through the torque convertor completes the retardation to zero speed from the prevailing direction and then smoothly accelerates the vehicle in the lower speed ratio in the opposite direction.

A further advantage of this arrangement is that the reduced speed of counter-rotation of the output of the torque convertor during the retardation results in less heat being generated in the torque convertor, thus obviating excessive temperature-rise therein, any loss of retardation exerted by the torque convertor being more than compensated by the additional retardation provided by the simultaneous application (in slipping condition) of the lower speed ratio in the opposite drive direction.

Figure 2:
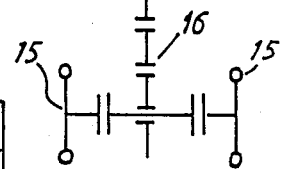
Figure 3:
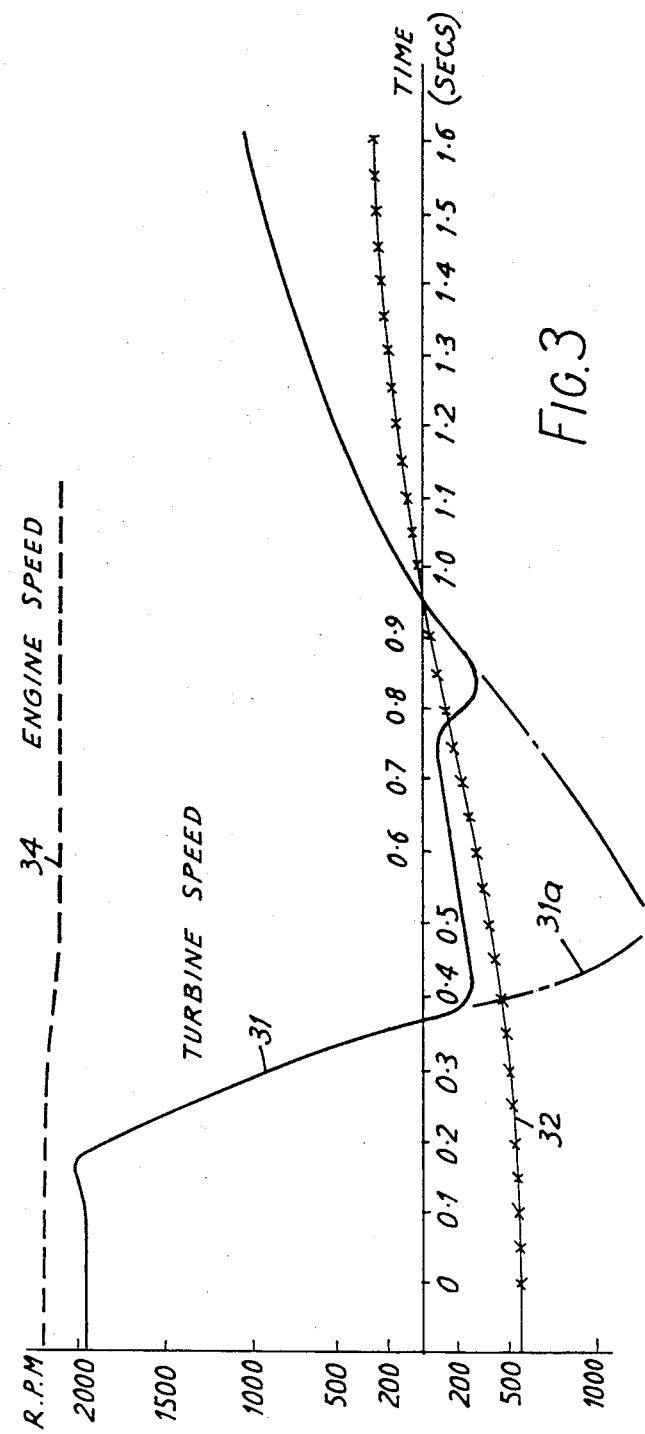
Figure 4:
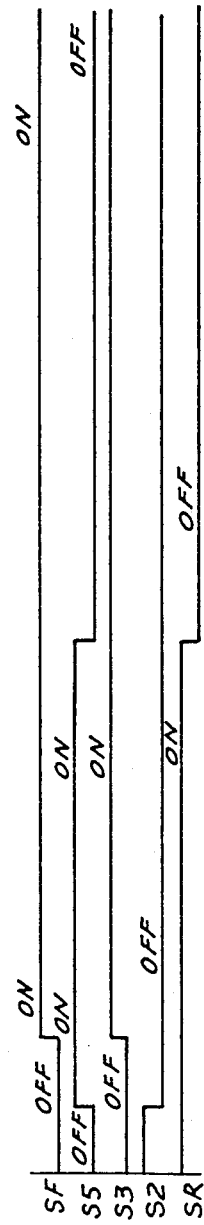

An embodiment of the invention will now be described by way of example with reference to the accompanying drawings, in which:

FIG. 1 is a diagram showing the elements of a transmission,

FIG. 2 is a table showing the elements of FIG. 1 which are applied to obtain the various ratios, FIG. 3 is a graph showing the speeds of various elements of the transmission during a change in the direction of movement of a vehicle fitted with the transmission, and FIG. 4 shows the operational states of the various control elements associated with the change of direction and ratio to the same time scale as FIG. 3.

The transmission shown in FIG. 1 is driven by an internal combustion engine (not shown) having a shaft 10 which drives an input shaft 11 of change speed gearing through a torque converter 12 of conventional type having an impeller or pump element 12a, a reaction member 12b and a runner or turbine 12c connected to the shaft 11, the impeller 12a being fixed to the engine shaft 10.

The shaft 11 forms an input to planetary gearing 13 of the kind shown in U.S. Pat. No. 4,172,393, comprising four epicyclic gear trains 1, 2, 3 and 4, each consisting of a central sun gear C an internally toothed ring gear R and a set of planet pinions P meshing with both the central gear C and the ring gear R. The planet pinions P are rotatably mounted in planet carriers L.

The central gears C3 and C4 are fixed to an output shaft 14 which is also secured to the planet carrier L2 and the ring gear R1. The central gear C2 is driveable from the input shaft 11 by means of a pressure fluid operated forward clutch K1. Similarly, the central gear C1 can be driven from the shaft 11 through a further fluid pressure operated clutch K2 and can also be held stationary by means of a first brake BR1. The ring gears R2 and R3 and the planet carrier L1 are all interconnected and can be held stationary by a brake BR2. The planet carrier L3 is connected to the ring gear R4 and can be held stationary by a fluid pressure operated brake BR3. The planet carrier L4 can be held stationary by a fourth fluid pressure operating brake BR4.

The output shaft 14 drives a pair of the vehicle wheels 15 through a gear 16 and a train 17 of idler gears meshing with the gear 18 on the shaft 14. In this embodiment, all of the ring gears R have 84 teeth, the central gear C1 has 48 teeth, central gear C2 has 40 teeth and the central gears C3 and C4 have 44 teeth.

The brakes BR1, BR2, BR3 and BR4 are supplied with oil under pressure PK from a source 19 through non return valves V4, V3, V2 and V1 and solenoid operated valves S4, S3, S2 and S1 which are all collectively controlled by a control unit 20. The forward clutch K1 can be supplied with oil under pressure P1 from a source 21 through a solenoid operated valve SF also controlled by the unit 20. The sources 19 and 21 for supplying the pressure Pk and Pl may be similar to those described in European Patent Specification No. 0040065.

The clutch K2 can also be supplied with fluid under pressure from the source 21 through solenoid operated valves SR and S5 connected in series.

The solenoid operated valves S1, S2, S3, S4, SF and SR in their un-energised condition isolate their associated brake or clutch from the respective supply and vent it to tank. In its unoperated state, the valve S5 connectes the downstream or outlet side of the reverse valve SR to the clutch K2. In its operated state, the valve S5 connects the source 21 directly to the clutch K2. The fluid pressure in the forward clutch K1 is applied through a line 24 to one end of the spool of the reverse valve SR in the direction to retain it in its unoperated state. The pressure in the clutch K2 is applied through a line 25 to act on the spool of the valve S4 in a direction to retain the latter in its unoperated state.

The various forward and reverse ratios which are obtainable from the change-speed gearing, the various frictional brakes and clutches which are to be engaged to establish these ratios and the solenoid operated valves which are required to be operated to engage the brakes and clutches are all shown in the table in FIG. 2. The gears 18 and 16 (interconnected by the transfer train 17) increase the overall ratio by a factor of 1.075.

Associated with the control unit 20 is a directional control lever 26, conveniently mounted on the steering column and having a forward position F, a reverse position R and a neutral position N to control the driving direction of the transmission. Changes between the various ratios of either direction may be manually controlled by the driver, for example by arranging that the lever 26 may be twisted between positions which respectively cause the control unit 20 to select intermediate ratios (if appropriate) or control the ratios automatically with the exception of the lowest ratio, particularly in the forward direction, which may be separately controllable by a 'kick-down' button 27 mounted adjacent or on the lever 26. In other respects, the control unit 20 causes changes between the forward ratios and between the reverse ratios in a conventional manner depending on sensed parameters such as engine speed, output speed and torque.

During a change in direction the engine throttle is allowed to remain effectively open, so the engine speed remains substantially at its full working value throughout the sequence of operations associated with change of direction of the vehicle.

Changing between one direction of drive and the other is of course determined manually by the driver. The sequence of operations in changing from second reverse speed to third forward speed will now be described in detail by way of example and will be noted that the speed ratios in the two directions are nearly equal. Accordingly, the control unit 20 can be programmed to change to the nearest ratio in the opposite direction when changing direction.

As can be seen from FIG. 2 and FIG. 4, in second reverse ratio the clutch K2 and the brake BR3 are engaged as a result of the energisation of the solenoids SR and S2. Now, to cause a change in direction, the driver moves the lever 26 from position 'R' to position 'F'. Because this results in movement of the lever through the neutral 'N' position in which normally no solenoid remains energised, the control unit 20 imposes a delay of approximately 0.5 second in the de-energising of the solenoid SR in order to hold the clutch K2 fully pressurised during the period while the lever is passing through the 'N' position, which period may be up to 0.4 second.

After the driver has moved the lever 26 from the reverse 'R' to the forward 'F' position, the control unit 20 first of all de-energizes the solenoid valve S2 and energizes the solenoid valve S5 at time 0 in FIGS. 3 and 4. This results in the brake BR3 being released and thus in a neutral condition in which only the clutch K2 is engaged. After 0.1 seconds, solenoid valves SF and S3 are energized in addition to the already energised solenoid valves SR and S5. The resulting pressurisation of the forward clutch K1 through the solenoid valve SF returns the valve SR to its 'off' position as the result of pressurisation of the line 24 but the clutch K2 will remain engaged as the result of the prior energisation of the valve S5 which supplies P1 pressure through a line 29 bypassing the valve SR.

With both clutches K1 and K2 engaged, the gearing is locked into simultaneous rotation but the vehicle is still travelling in reverse and thus drives back through the gearing to rotate the turbine 12C of the torque convertor in the opposite direction to the engine shaft 10 but at a relatively low speed since the transmission is effectively in the highest forward ratio (F5). The torque convertor thus imposes on the turbine and on the transmission a greater torque in the direction of engine rotation than it would deliver under normal starting conditions at stall (i.e. with the turbine stationary). As can be seen from FIG. 3 where the curve 31 shows the turbine speed plotted against the time scale, this counter rotation of the turbine is achieved in 0.4 seconds from the starting of the reversing action.

The retardation of the vehicle is further increased as the result of energisation of the solenoid valve S3. This results in filling of the actuator cylinder of the brake BR2 followed by pressurisation of this brake actuator with consequent further absorption of the vehicle's kinetic energy from its residual reverse motion.

Finally, and before the vehicle has come to rest, the valves S5 and SR are released, in this case after 0.65 second. The transmission is now in its third forward ratio although still travelling slowly backwards and thus with relatively low counter rotation of the turbine. The considerable torque which is accordingly transmitted through the torque convertor completes the retardation to zero speed (hereafter 0.95 second) and thereafter smoothly accelerates the vehicle in the forward direction without shock.

In FIG. 3, the line 31a indicates the turbine speed (in negative direction) which would occur if the clutch K2 were to be released at the instant when the forward clutch is engaged. Under such conditions, the variation in the turbine speed (to a relatively large negative value) could result in the generation of excessive heat in the torque convertor.

Also in FIG. 3, the line 32 shows the output speed plotted against the time scale and the line 34 shows the very small variation in engine speed during the reversal process.

The control system 20 may be arranged to perform similar operations when changing into third forward speed from first reverse speed (in which case the brake BR4 is initially released) and from third reverse speed (in which case the brake BR2 is initially released although subsequently re-engaged and a delay of 0.1 second is preferably introduced between engagement of the forward clutch K1 and initiation of re-engagement of the brake BR2). In all cases, the clutch K2 should be released before the negative output speed falls to zero. To ensure that this happens, de-energisation of the valves SR and S5 should occur when the negative output speed has fallen to approximately 300 rpm.

When the control lever 26 is moved from 'R' to 'N' and is allowed to remain in 'N' position for longer than the imposed delay period of approximately 0.5 second, its subsequent movement to 'F' position will result in the selected forward ratio being engaged directly unless the gearbox output speed exceeds 500 rpm, in which case the 5th forward ratio will be engaged directly.

What is claimed is:

1. A transmission for a vehicle comprising a torque convertor to be driven by an internal combustion engine, and planetary change speed gearing having an input driven by the output of the torque convertor and an output connected to the driving wheels of the vehicle, the change-speed gearing being of the kind in which the individual speed ratios in both a forward direction and a reverse direction of drive are each selectively engaged by the engagement of associated friction elements to provide a plurality of speed ratios in the forward direction and at least one speed ratio in the reverse direction and a driver-operated direction control element, characterised by:

control means responsive to movement of the direction control element from a first position corresponding to the prevailing direction of drive to a second position corresponding to the opposite direction of drive to cause in sequence: release of the friction element or elements determining the ratio engaged in the prevailing direction of drive, engagement of the friction element or elements associated with a high speed ratio in the opposite direction of drive and initiating engagement of the friction element or elements associated with a lower speed ratio in the said opposite direction of drive, followed by release of the friction element or elements associated with the said high ratio in the said opposite direction of drive after a period of retardation of the vehicle but before the vehicle speed has been reduced to zero in the said prevailing direction;

the control member having a neutral position between its forward and reverse positions;

the control means, on movement of the control member through the neutral position, delaying release of the then engaged friction element corresponding to the previously engaged direction for a predetermined interval of time sufficient to allow the control member to reach a new non-neutral position; and the control means, when the control member remains in the neutral position in excess of said predetermined interval of time, permitting subsequent direct shifting movement of the control member into any forward speed ratio except when the transmission output speed exceeds a determined speed in which case the high forward speed ratio is directly engaged.

2. A transmission according to claim 1, wherein the control means are arranged so as, on movement of the control member from its reverse position to its forward position, to delay release of the then engaged friction element corresponding to the previously engaged reverse drive ratio for an interval of time sufficient to allow the control member to reach the forward position.

3. A transmission according to claim 2, wherein said control member comprises a manually shiftable control lever.

* * * * *